UNITED STATES PATENT OFFICE.

THOMAS FLETCHER, OF WARRINGTON, ENGLAND.

COMPOSITION FOR FILLING TEETH.

SPECIFICATION forming part of Letters Patent No. 225,817, dated March 23, 1880.

Application filed December 12, 1879.

*To all whom it may concern:*

Be it known that I, THOMAS FLETCHER, of Warrington, England, have invented certain new and useful Improvements in Composition for Filling Teeth, of which the following is a specification.

This invention relates to an improved material for filling and repairing teeth, for the settings of artificial teeth, and for securing artificial teeth in their settings. It is required in such a material that it shall have the form of a plastic mass easily worked, and which will ultimately set to a hard and dense condition, and resist the action of the fluids of the mouth.

The properties indicated I have found by many experiments to be possessed by the phosphate of alumina, and either mixed together or separately, when dissolved and reduced to a pasty mass, by the addition of phosphoric or pyrophosphoric acid and water or other suitable solvent.

In preparing the material for use I take the phosphate or pyrophosphate of alumina, or portions of both, in the desired quantity, and triturate the same with a sufficient quantity of phosphoric or pyrophosphoric acid and water to form a pasty mass thick enough for use. The paste is best made with the assistance of heat.

I prefer to make this mixture a somewhat thin paste, and take up the excess of acid by adding powdered hydrate of alumina, magnesia, heavy oxide of zinc, basic silicate of zinc, or other materials of similar nature with which it will combine and set into a hard mass, such material being added in sufficient quantity to give the mass a proper consistency to be easily molded or worked in the filling of teeth or making or repairing settings or plates of artificial teeth.

The paste, when combined with a powder, as above, has the property of setting into an extremely hard and dense mass, similar in appearance to unglazed porcelain, and which offers a singularly great resistance to the action of the fluids of the mouth. It can be made of any color desired by the addition of coloring-matters during the preparation.

The proportion of ingredients I use preferably are as follows: For the paste of phosphate or pyrophosphate of alumina, alumina phosphate or pyrophosphate, four parts; glacial phosphoric acid, eight to sixteen parts; water, four to ten parts, varying with the powder used, time of setting required, and other properties, according to the purpose it is to be used for. To this paste is to be added any of the substances already referred to in quantity required to make a stiff plastic mass similar in consistency to softened gutta-percha.

Though usually more convenient, it is not essential that a phosphate of alumina or magnesia shall be used in the first paste, as the phosphate may be formed by the direct mixture of alumina hydrate, in which case the proportion of phosphoric acid may require to be increased.

It is impossible to give precise proportions for all purposes, as they vary greatly. The materials used have water in combination, which varies greatly according to the process by which they are prepared and the temperature at which they are dried, and the proportions must of necessity be got at by direct trial with every fresh sample of materials used.

What I claim is—

1. A dental paste composed of alumina pyrophosphate or phosphate, or its equivalent, and phosphoric acid, pyrophosphoric acid, or equivalent, and water, substantially as set forth.

2. A dental paste composed of alumina pyrophosphate or phosphate, or equivalent, phosphoric acid, water, or an equivalent solvent, and a substance capable of combining therewith to take up excess of the acid and solvent, and forming a hard mass when set, substantially as set forth.

In testimony that I claim the foregoing I have hereunto set my hand in the presence of the subscribing witnesses.

THOMAS FLETCHER.

Witnesses:
 JAMES CHAPMAN,
  53 *Brown St., Manchester.*
 A. W. TRINDLE,
  *Clerk with Mr. A. B. Rowley, Solicitor, Manchester.*